United States Patent [19]

Tsuda et al.

[11] Patent Number: 5,896,163
[45] Date of Patent: Apr. 20, 1999

[54] LASER LIQUID CRYSTAL MARKER AND METHOD FOR JUDGING DETERIORATION OF LIQUID CRYSTAL

[75] Inventors: Yukihiro Tsuda; Yoshinori Saito; Etsurou Sato; Yukinori Matsumura, all of Kanagawa, Japan

[73] Assignee: Kabushiki Kaisha Komatsu Seisakusho, Tokyo, Japan

[21] Appl. No.: 08/549,744

[22] PCT Filed: Apr. 27, 1994

[86] PCT No.: PCT/JP94/00703

§ 371 Date: Nov. 7, 1995

§ 102(e) Date: Nov. 7, 1995

[87] PCT Pub. No.: WO94/26457

PCT Pub. Date: Nov. 24, 1994

[30] Foreign Application Priority Data

May 7, 1993 [JP] Japan ..................... 5-131167
May 13, 1993 [JP] Japan ..................... 5-134091

[51] Int. Cl.[6] .................................... B41J 2/47
[52] U.S. Cl. ............................................... 347/255
[58] Field of Search ............................. 347/255, 256, 347/246; 349/111, 3, 170

[56] References Cited

U.S. PATENT DOCUMENTS 4,810,062  3/1989  Aoki et al. ............... 349/111

FOREIGN PATENT DOCUMENTS 64-11088   1/1989   Japan.
2-268988  11/1990   Japan.
5-42379    2/1993   Japan.

*Primary Examiner*—Mark J. Reinhart
*Attorney, Agent, or Firm*—Sidley & Austin

[57] ABSTRACT

A laser liquid crystal marker and a method of judging deterioration of the liquid crystal make it possible to maintain high printing accuracy, ascertain the proper time for replacement of liquid crystal and, further, maintain high printing accuracy even when high speed printing is continuously performed. The marker has a temperature sensor (4), light emitting means (5), light receiving means (6), and a controller (7). The controller (7) calculates a light transmittance (Qi) from the irradiation quantity of light (R1) of the light emitting means (5) and the transmitted quantity of light (R2) received by the light receiving means (6), and adjusts the applied voltage (Vi) of the liquid crystal (2) so that the light transmittance (Qi) becomes equal to an optimum light transmittance (Qo), stored in advance. Further, when the light transmittance (Qi) does not become equal to the optimum light transmittance (Qo), even by adjusting the voltage (Vi) applied to the liquid crystal, it is determined that the liquid crystal (2) has deteriorated.

20 Claims, 9 Drawing Sheets

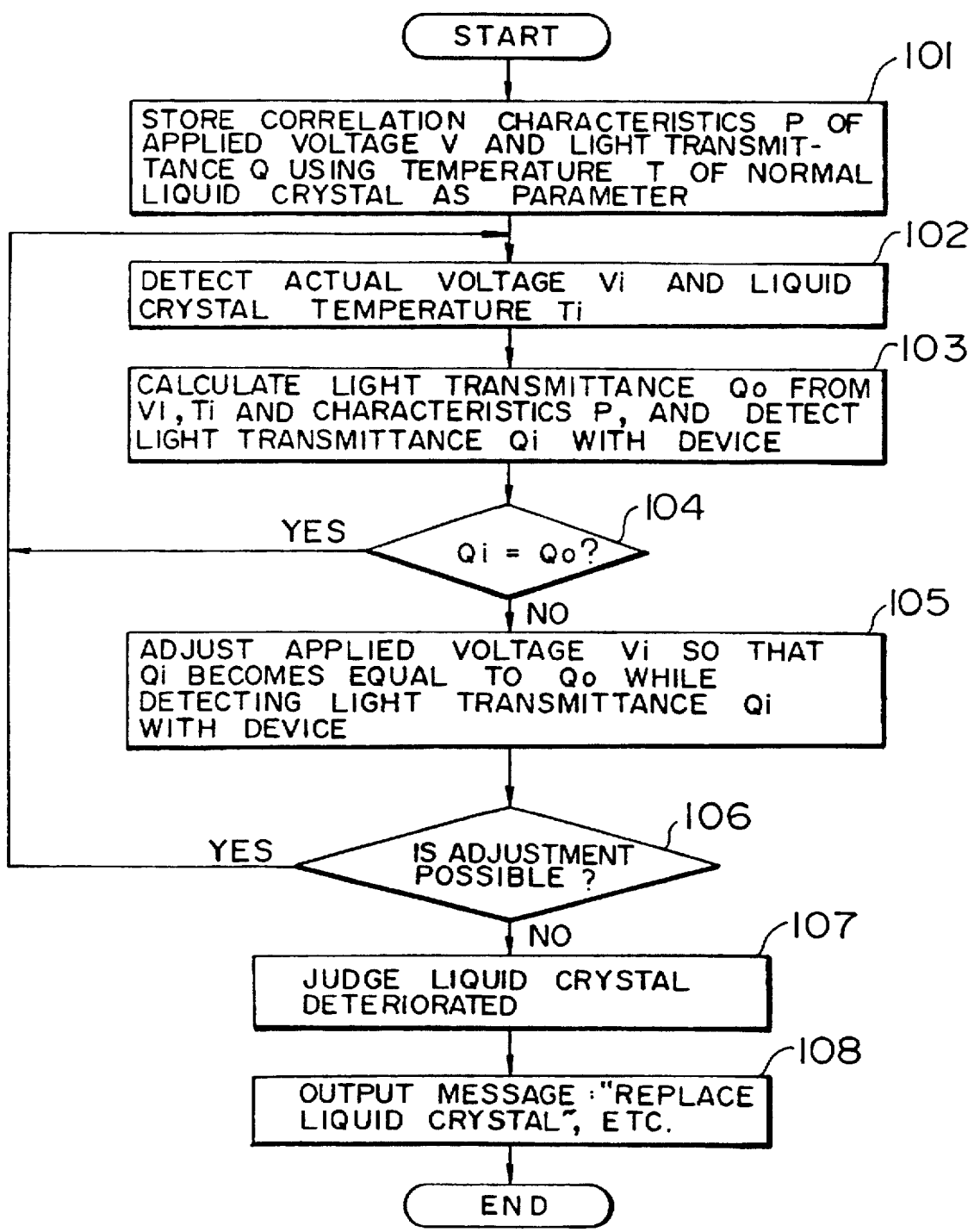

LASER LIQUID CRYSTAL MARKER AND METHOD FOR JUDGING DETERIORATION OF LIQUID CRYSTAL

TECHNICAL FIELD

The present invention relates to a laser liquid crystal marker and a method for judging the deterioration of a liquid crystal, and, in particular, to a laser liquid crystal marker and a method for judging the deterioration of a liquid crystal which are suitable for a workpiece printing that requires a high level of accuracy.

BACKGROUND ART

There exist a variety of conventional laser liquid crystal markers, also called "transmission type liquid crystal mask markers". Generally speaking, a laser liquid crystal marker comprises a laser oscillator, a lens system for expanding, condensing or collimating a laser beam, a liquid crystal serving as a transmission type liquid crystal mask for arbitrary pattern display, one or two sets of X-Y deflectors for deflecting the optical path of the laser beam, a controller for performing a synchronized control of a separately provided workpiece feeder, etc. In such a construction, the controller causes the laser oscillator to emit a laser beam, which is applied to the liquid crystal. The laser beam transmitted through the liquid crystal is applied to the surface of a workpiece, whereby the pattern of the liquid crystal is printed on the surface of the workpiece.

In such a laser liquid crystal marker, the clearness in printing deteriorates with use. In the conventional laser liquid crystal markers, this deterioration has only been coped with empirically, that is, by methods that are not rational enough. The judgment as to whether or not the liquid crystal has deteriorated has been made by visually examining the printing conditions (the degree of clearness in printing, etc.) on the workpiece surface. With the current state of the art, any deterioration in the printing conditions has been coped with, for example, by appropriately increasing the laser output, cleaning the lens system, replacing the liquid crystal, adjusting the driving system of the X-Y deflectors or the workpiece feeder, or replacing the controller. Such measures cannot be regarded as appropriate in coping with the above deterioration.

According to a known printing method, a liquid crystal operation display section is provided in a part of the liquid crystal, and a detector is connected to this display section, which is irradiated with a beam of light different from that for printing to thereby detect changes in the response time of the liquid crystal due to changes in the ambient temperature; on the basis of this detection, the switching operation time for the laser is corrected by the controller, thereby realizing a clear printing on the surface of a workpiece (See, for example, Japanese Patent Laid-Open No. 64-11088). However, with the above described method, in which the operation time is corrected in correspondence with the changes in the response time of the liquid crystal, the degree of deterioration of the liquid crystal cannot be checked, nor can the liquid crystal itself be controlled for clear printing.

In another conventional technique, already proposed by the present applicant, there is provided a laser liquid crystal marker called a "YAG laser mask marker" (See Japanese Patent Laid-Open No. 5-42379), which is equipped with first and second X-Y deflectors arranged on either side of the liquid crystal. Separate still images are sequentially displayed through the liquid crystal. The first X-Y deflector causes a laser beam to scan each separate still image, and the second X-Y deflector causes the laser beam transmitted through the separate still images to be sequentially applied in deflective irradiation to the surface of a workpiece until the entire printing is completed, thereby realizing a high accuracy, high speed continuous printing. However, the above method has a problem in that the deterioration in the clearness in printing on the workpiece surface cannot be checked by a rational method, so that it is rather difficult to properly cope with the deterioration in clearness.

SUMMARY OF THE INVENTION

In coping with this problem of deterioration in clearness of printing, the present applicants directed their attention to the following fact: the light transmittance of a liquid crystal can be varied by varying the voltage applied thereto. In other words, the clearness in printing can be controlled through the applied voltage. This control ought to be realized by adding a specific program to the controller used in an existing laser liquid crystal marker (or a simple additional controller that is separately provided). However, varying the applied voltage at random will only result in variations in printing accuracy. Further, there is a range of applied voltage in which it is difficult to maintain an optimum printing condition even by varying the applied voltage (which range corresponds to the time at which the liquid crystal is to be replaced). Thus, the present applicants came to a conclusion that, by constantly keeping track of the degree of deterioration of the liquid crystal, it ought to be possible to apply an optimum voltage corresponding to the degree of deterioration, thereby making it possible at least to prevent the deterioration in printing accuracy due to the deterioration of the liquid crystal.

The present invention has been made with a view toward solving the above problems in the prior art technique, focusing attention on the above point. It is accordingly an object of the present invention to provide a liquid crystal marker and a method of judging deterioration of liquid crystal in which, to maintain a high level of accuracy in printing, it is possible to control the applied voltage in correspondence with the degree of deterioration of the liquid crystal, to decide on the time at which the liquid crystal is to be replaced and, further, to maintain a high level of accuracy in printing even in continuous high speed printing.

In a first aspect of the present invention, there is provided a laser liquid crystal marker comprising: a controller; a temperature sensor connected to the controller and adapted to detect a liquid crystal temperature Ti; light emitting means for irradiating the liquid crystal with light; and light receiving means for receiving the light transmitted through the liquid crystal, wherein the controller stores in advance correlation characteristics P of an applied voltage V of the liquid crystal and a light transmittance Q using a liquid crystal temperature T in a normal liquid crystal as a parameter; wherein an irradiation quantity of light R1 emitted by the light emitting means and transmission quantity of light R2 received by the light receiving means are inputted to the controller to calculate a light transmittance Qi from the irradiation quantity of light R1 and the transmitted quantity of light R2; and wherein an optimum light transmittance Qo corresponding to the applied voltage Vi of the liquid crystal at the time of this calculation and the liquid crystal temperature Ti supplied from the temperature sensor is extracted from the correlation characteristics P, the controller adjusting the applied voltage Vi of the liquid crystal so that the light transmittance Qi becomes equal to the light transmittance Qo. The controller stores in advance correlation characteristics P of the applied voltage V of the liquid crystal and the light transmittance Q using a liquid crystal temperature T in a normal liquid crystal as a parameter; and, when judging the degree of deterioration of this liquid crystal, the irradiation quantity of light R1 emitted from the light emitting means and the transmitted quantity of light R2 received by light receiving means are inputted to the controller to calculate the light transmittance Qi from the irradiation quantity of light R1 and the transmitted quantity of light R2, wherein the optimum light transmittance Qo corresponding to the applied voltage Vi of the liquid crystal at the time of this calculation and the light crystal temperature Ti supplied from the temperature sensor is extracted from the correlation characteristic P, and wherein, by adjusting this liquid crystal applied voltage Vi, the light transmittance Qi and the optimum light transmittance Qo are equalized; further, when the light transmittance Qi and the optimum light transmittance Qo do not become equal to each other even by adjusting the applied voltage Vi of the liquid crystal, the controller outputs a message to the effect that the liquid crystal has been deteriorated.

With this construction, two light transmittances Q, one at the light crystal temperature Ti and the other at the applied voltage Vi of the liquid crystal, can be obtained. One is a light transmittance Qi calculated from the irradiation quantity of light R1 and the transmitted quantity of light R2; and the other is the optimum light transmittance Qo extracted from correlation characteristics P in a normal liquid crystal. The liquid crystal application voltage Vi is adjusted by the controller so that the light transmittance Qi and the optimum light transmittance become equal to each other, and printing is performed while maintaining this optimum light transmittance Qo, so that a satisfactory degree of clearness can be obtained, and an optimum printing condition can be maintained. When the optimum light transmittance Qo cannot be obtained, even by adjusting the applied voltage Vi of the liquid crystal, a message is outputted to the effect that the liquid crystal has been deteriorated, whereby the time of replacement for the liquid crystal due to the expiration of service life can be properly decided upon.

In a second aspect of the present invention, there is provided a laser liquid crystal marker, wherein connected to a controller are light emitting means for irradiating a liquid crystal with light and light receiving means for receiving the light transmitted through the liquid crystal, wherein the controller stores in advance a reference value So, and an irradiation quantity of light R1 emitted by the light emitting means and a transmitted quantity of light R2 received by the light receiving means are inputted to the controller to calculate a detection value Si thereof, the controller adjusting the applied voltage Vi of the liquid crystal so that the detection value Si becomes equal to the reference value So. The controller stores in advance the reference value So and an application voltage threshold value Vm, and the irradiation quantity of light R1 emitted by the light emitting means and the transmitted quantity of light R2 received by the light receiving means are inputted to the controller to calculate the detection value Si thereof, the controller adjusting the applied voltage Vi of the liquid crystal so that the detection value Si becomes equal to the reference value So; when this applied voltage Vi of the liquid crystal is in excess of the application voltage threshold value Vm, the controller outputs a warning.

Unlike the construction according to the first aspect of the invention, the above described construction is intended for the case in which the liquid crystal temperature Ti is not considered as a parameter. This proves useful, in particular, when the laser liquid crystal marker to be operated is installed in an air conditioned room, with the working liquid crystal temperature at the time of driving being known. That is, a reference value So corresponding to the working liquid crystal temperature Ti is set in advance in the controller, and the applied voltage Vi of the liquid crystal is adjusted so that the detection value Si becomes equal to this reference value So. Further, by providing an application voltage threshold value Vm that serves as a voltage corresponding to the liquid crystal deterioration limit, etc. in the controller, the applied voltage Vi of the liquid crystal is adjusted so that the detection value Si becomes equal to the reference value So. When this applied voltage Vi of the liquid crystal is in excess of the application voltage threshold value Vm, a warning is issued, whereby an optimum printing condition can be maintained, and the degree of deterioration corresponding to the limit of the service life of the liquid crystal can be correctly determined.

In a third aspect of the present invention, there is provided a laser liquid crystal marker, in which, connected to a controller are light emitting means and light receiving means, and in which a voltage is applied to a liquid crystal from the controller for a successive rewrite display of various still marking images, with a still test image being appropriately displayed, wherein the light emitting means projects light onto the displayed still test image, and the light receiving means receives the light transmitted through the still test image, wherein the controller stores in advance an optimum light transmittance Qo, and effects interrupt display of the still test image during at least one of the rewrite processes for the still marking images, wherein a transmitted quantity of light R2 is inputted during this interrupt display from the light receiving means, and the light transmittance Qi of the liquid crystal is calculated from the transmitted quantity of light R2 and the irradiation quantity of light R1, the controller adjusting the applied voltage Vi of the liquid crystal so that the light transmittance Qi becomes equal to the optimum light transmittance Qo. The controller stores in advance the optimum light transmittance Qo, and, during at least one of the rewriting processes for the still marking images causes a still test image to be displayed, and after this, effects interrupt of the repetition of the equalization in electric potential of all the common terminals and segment terminals, and during this interrupt, inputs the transmitted quantity of light R2 from the light receiving means to calculate the light transmittance Qi of the liquid crystal from the transmitted quantity of light R2 and the irradiation quantity of light R1 of the light emitting means, the controller adjusting the applied voltage Vi of the liquid crystal so that this light transmittance Qi becomes equal to the optimum light transmittance Qo.

In this construction, an interrupt display of a still test image (an image for measuring light transmittance) is effected during the rewriting of a successive rewrite display of still marking images (images for printing) on the liquid crystal, and, during this interrupt display, the transmittance Qi is measured, and compared with the optimum light transmittance Qo to thereby adjust the applied voltage Vi of the liquid crystal for the still images. Due to this arrangement, it is possible to maintain an optimum printing condition, even in a laser liquid crystal marker capable of continuous high speed printing. Further, due to the equalization in potential of the terminals of the liquid crystal, it is possible to maintain an optimum printing condition capable of high speed continuous printing. That is, an interrupt in a laser liquid crystal marker for high accuracy, high speed printing, which is best performed during workpiece standby periods so as not to cause a reduction in throughput, can in some cases be insufficient, that is, a satisfactory result cannot be obtained by simply effecting an interrupt display of a still test image for the measurement of the transmittance Qi. That is, when even this workpiece standby period is very short, it is necessary, even when a command to erase the still test image is issued, to display the next still test image before the after image thereof has vanished, resulting in a deterioration in printing performance. However, in such cases, as in the present invention, immediately after the display of the still test image on the liquid crystal (which is normally effected for a very short period of time), all of the common and segment terminals of this liquid crystal are equalized in electric potential, whereby the still test image vanishes leaving practically no after image, so that it is possible to maintain an optimum printing condition.

In a fourth aspect of the present invention, there is provided a method for judging deterioration of liquid crystal, the method comprising the steps of: irradiating a liquid crystal with light in an irradiation quantity of light R1; detecting a transmitted quantity of light R2 transmitted through this liquid crystal; calculating a light transmittance Qi on the basis of the irradiation light quantity R1 and the transmitted quantity of light R2; and judging the degree of deterioration of the liquid crystal from changes with time of this light transmittance Qi.

Due to this arrangement, it is possible to correctly judge the degree of deterioration of a liquid crystal. Thus, unlike the conventional empirical measures, this method makes it possible to check the degree of deterioration of a liquid crystal on a rational basis and properly replace the liquid crystal.

BRIEF DESCRIPTION OF THE DRAWINGS

FIGS. 2A through 2C are views illustrating how the laser liquid crystal marker of FIG. 1 is controlled, of which FIG. 2A is a flowchart illustrating the section of the operation of the controller for judging the degree of deterioration of a liquid crystal, FIG. 2B is a graph showing correlation characteristics of liquid crystal application voltage and light transmittance when liquid crystal temperature is used as a parameter, and FIG. 2C is a graph showing correlation characteristics of liquid crystal application voltage and light transmittance when deterioration of liquid crystal is used as a parameter;

BEST MODE FOR CARRYING OUT THE INVENTION

A preferred embodiment of a laser liquid crystal marker according to the first aspect of the invention will now be described in detail with reference to the accompanying drawings.

Figure 1:
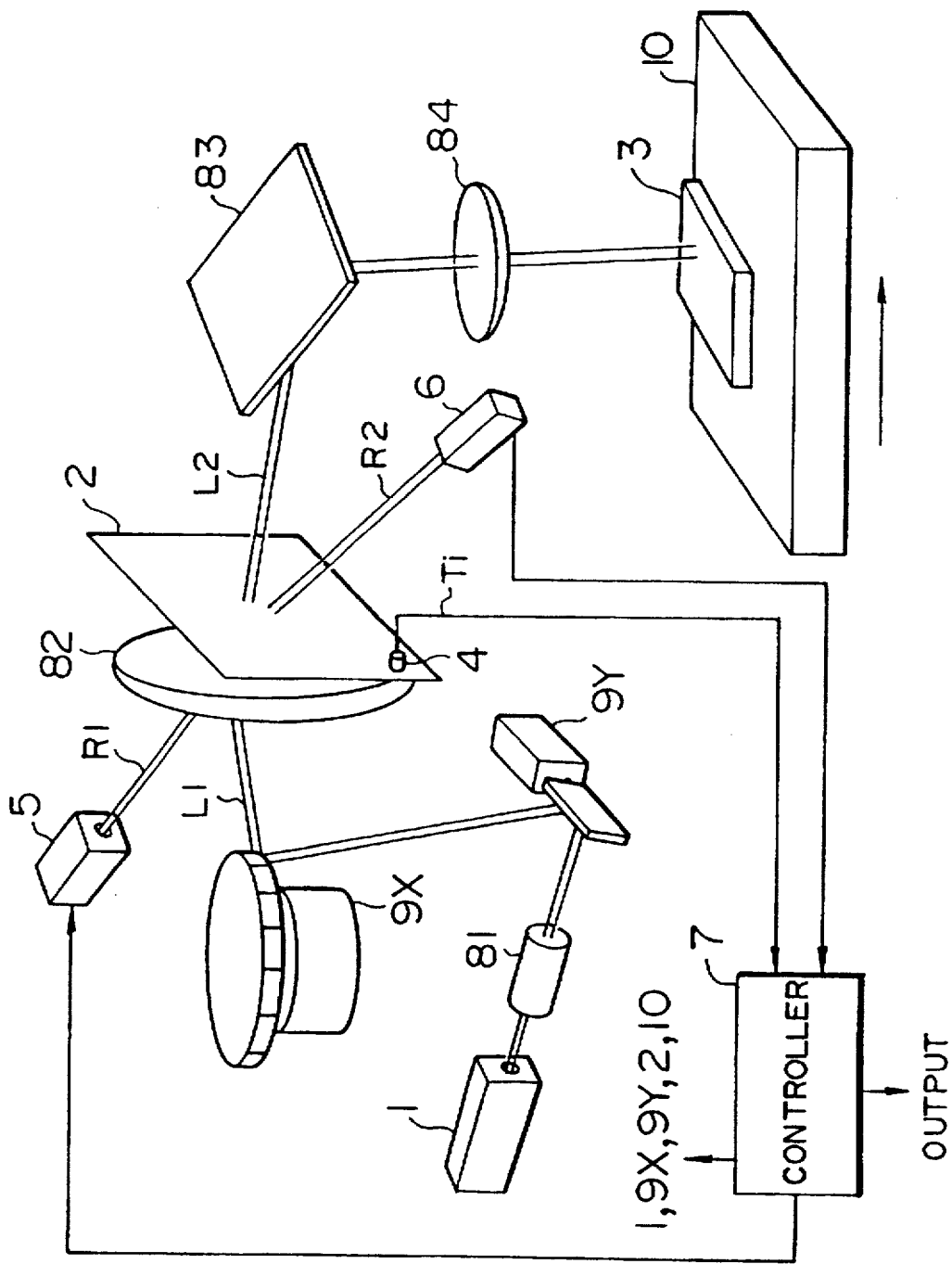
FIG. 1 is a schematic view showing the construction of a laser liquid crystal marker according to the first aspect of the present invention.

FIG. 1 shows the hardware construction of a laser liquid crystal marker, in which laser scanning is performed on a pattern of a liquid crystal 2 by a polygon mirror 9X and a galvanoscanner 9Y, which serve as XY deflectors. A laser beam L1, emitted from a laser oscillator 1, travels through a beam shaping device 81, and is first deflected in the Y direction by the galvanoscanner 9Y. Then, it is deflected in the X direction by the polygon mirror 9X. The laser beam thus deflected is further deflected by a lens 82 such that it is condensed on a reflecting mirror 83. In this process, scanning irradiation is effected on a pattern of the liquid crystal 2, and exclusively a transmission laser beam L2, which is in conformity with the pattern, is applied to the reflecting mirror 83. The transmission laser beam L2, reflected by the reflecting mirror 83, is transmitted through an objective lens 84 before it is applied to the surface of a workpiece 3 on a workpiece feeder 10, to thereby print the pattern on the surface of the workpiece 3. In this construction, the driving system for the laser oscillator 1, the XY deflectors 9X and 9Y, the liquid crystal 2 and the workpiece feeder 10, are electrically connected to a controller 7 and synchronously controlled by the controller 7. Further, electrically connected to the controller 7 are a temperature sensor 4 for detecting the temperature Ti of the liquid crystal 2, light emitting means 5 for irradiating the liquid crystal 2 with light in an irradiation quantity of light R1, and light receiving means 6 for receiving the light transmitted through the light crystal 2, in a transmitted light quantity R2. Apart from the synchronous control mentioned above, this controller performs control procedures described below.

Figure 2B:
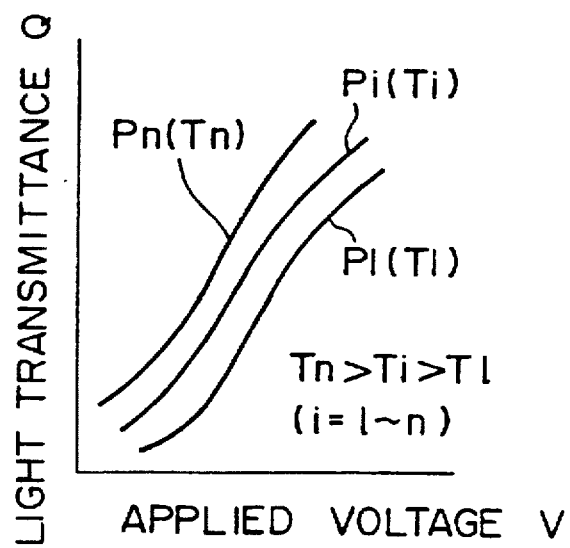
Figure 2C:
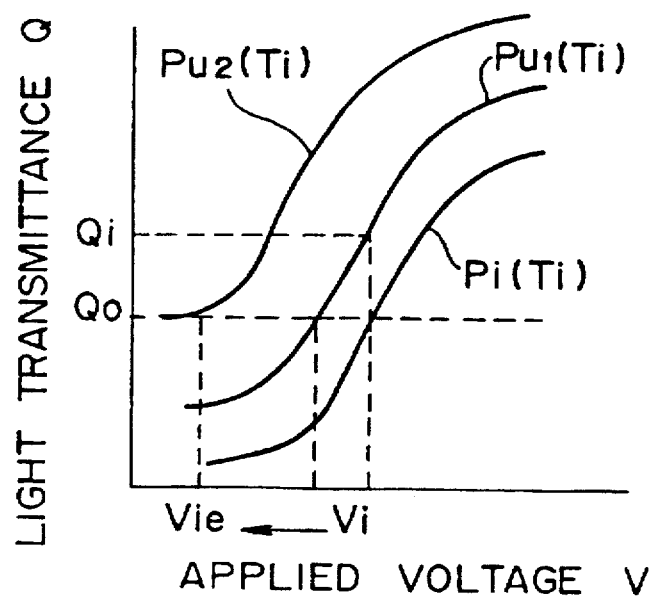

The software construction of the controller 7, in the construction described above, will be described with reference to FIGS. 1 and 2A through 2C. The controller 7 stores in advance the correlation characteristics P of the liquid crystal application voltage v applied to the liquid crystal 2 for pattern display and the light transmittance Q of the liquid crystal 2 at the time of light transmission, using liquid crystal temperatures T of this liquid crystal 2 as parameters (step 101). As shown in FIG. 2B, when, for example, the liquid crystal temperature T is a specific temperature T1, the light transmittance Q (the vertical axis) of the liquid crystal 2 has a correlation characteristic PI, in which it changes with the liquid crystal application voltage V (the horizontal axis). When the liquid crystal temperature gradually increases (T=T1→Ti→Tn), or the liquid crystal 2 deteriorates, this correlation characteristic P indicates a shift upward toward the lefthand side, as can be seen from the diagram (P=P1→Pi→Pn). In short, a rise in the liquid crystal temperature T, a deterioration in the liquid crystal 2, or an increase in the liquid crystal application voltage V causes the light transmittance Q of the liquid crystal 2 to increase. It should be noted that an increase in the liquid crystal temperature T and an increase or decrease in the liquid crystal application voltage V are factors which can be set independently of a deterioration in the liquid crystal. Thus, to measure the degree of deterioration of the liquid crystal 2, the controller 7 stores the following correlation characteristic P in advance: using liquid crystal temperatures T of the liquid crystal 2 as parameters, light is applied from the light emitting means 5, consisting of a semiconductor laser or the like, to the liquid crystal 2 while varying the application voltage V applied to the liquid crystal 2 for pattern display, and the light transmitted through the liquid crystal 2 is received by the light receiving means 6, which consists of a PIN diode or the like. From the irradiation quantity of light R1 and the transmitted quantity of light R2, the light transmittance Q of the liquid crystal 2 is calculated to obtain the correlation characteristics P shown in FIG. 2B, which are, as stated above, stored.

Next, the controller 7 judges the degree of deterioration of an actually used liquid crystal 2, and performs control so as to maintain an optimum light transmittance Qo. That is, the applied voltage Vi of the liquid crystal and the liquid crystal temperature Ti are inputted to the controller 7 (step 102). In this embodiment, a system is adopted in which the controller 7 also outputs the liquid crystal application voltage V applied to the liquid crystal 2, so that this liquid crystal application voltage V is used as the applied voltage Vi of the liquid crystal. In a case in which the controller 7 is separately arranged with respect to the controller of the main body, the liquid crystal application voltage V is inputted from the controller of the main body. In that case, the liquid crystal temperature Ti is inputted from the temperature sensor 4.

Next, the controller 7 extracts a characteristic corresponding to the liquid crystal temperature Ti from the stored correlation characteristics P. This will be regarded as the correlation characteristic Pi(Ti) shown in FIG. 2C. This allows the correlation characteristic Pi(Ti) serving as a reference to be determined, whereby an optimum light transmittance Qo for the normal liquid crystal 2 at the liquid crystal application voltage Vi is obtained. Almost simultaneously with this, the controller 7 calculates the light transmittance Qi of the liquid crystal 2 in use from the irradiation quantity of light R1 and the transmitted quantity of light R2 (step 103). Since the irradiation quantity of light R1 from the light emitting means 5 is determined by the quantity of electricity the controller 7 has supplied to the light emitting means 5, this quantity of electricity is obtained through internal processing.

Next, the controller 7 makes a judgment as to whether the light transmittance Qi is equal to the optimum light transmittance Qo or not (step 104). When it is determined that it is not, the applied voltage Vi of the liquid crystal is adjusted so that the light transmittance Qi becomes equal to the optimum light transmittance Qo (step 105). This procedure is based on the fact that, if there is no deterioration in the liquid crystal 2, the light transmittance Qi is equal to the optimum light transmittance Qo and is constant, whereas, if the liquid crystal 2 has deteriorated, the light transmittance Qi becomes, as stated above, larger than the optimum light transmittance Qi even when the liquid crystal temperature Ti or the applied voltage Vi of the liquid crystal is the same (The characteristics shown in FIG. 2C: Pi(Ti)→Pu1(Ti)→Pu2(Ti)). By adjusting this applied voltage Vi of the liquid crystal 2, it is possible to obtain the optimum light transmittance (Qi=Qo) even when the liquid crystal 2 has deteriorated. However, when the deterioration of the liquid crystal 2 further progresses, a condition is brought about in which, as indicated by the characteristic Pu2(Ti), the optimum light transmittance Qo cannot be obtained even by adjusting the applied voltage Vi of the liquid crystal (Vi→Vie, Qi≠Qo) (step 106). In this case, it is determined that the liquid crystal 2 is at the end of its service life (step 107), and a display to that effect is outputted as required (step 108). As stated above, printing is performed while checking the condition of the characteristics of the liquid crystal 2 on the basis of a rational judgment, so that a satisfactory level of clearness is obtained, and an optimum printing condition is maintained. Further, it is possible to properly check the service life of the liquid crystal 2.

Figure 3:
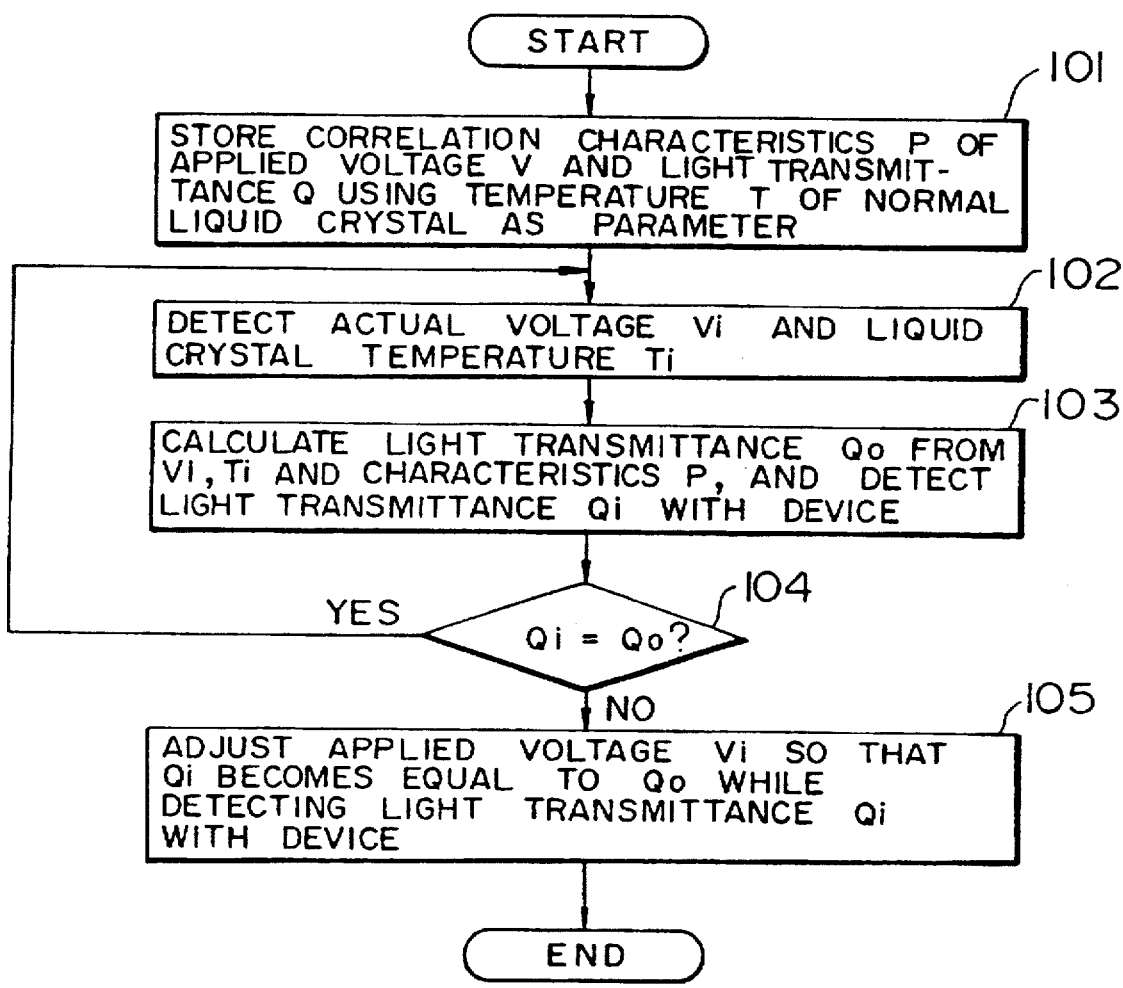
FIG. 3 is a flowchart illustrating control procedures for a controller in another embodiment according to the first aspect of the present invention.

Further, as shown in FIG. 3, steps 106 through 108 in the software construction of the controller 7 of the above described embodiment (See FIG. 2A) can be omitted. This makes it possible to maintain an optimum printing condition. The time for replacement of the liquid crystal may be decided upon by setting it in advance in terms of printing time, etc., checking the printing condition of the workpiece surface, etc. Further, in an applied case, in step 105 of the above described embodiment, the progress in the deterioration of the liquid crystal can be visually outputted, based on the amount of the adjustment of the liquid crystal application voltage.

A preferred embodiment of a laser liquid crystal marker according to the second aspect of the invention will be described in detail with reference to the accompanying drawings.

Figure 4:
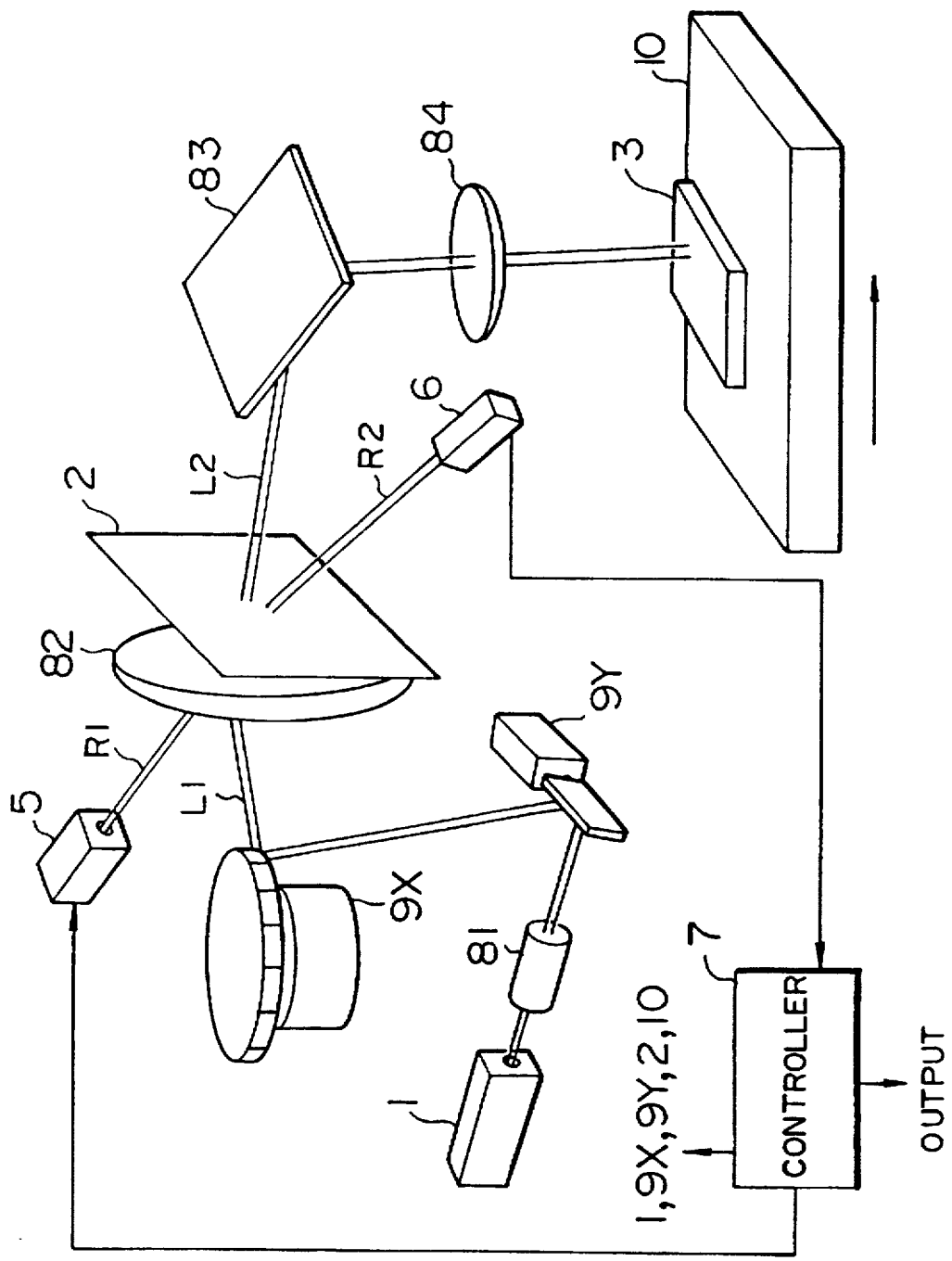
FIG. 4 is a schematic view showing the construction of a laser liquid crystal marker according to the second and third aspects of the present invention.

FIG. 4 shows the hardware construction of this embodiment. The construction of this embodiment only differs from that of FIG. 1 in that the temperature sensor 4 is removed, so a description of the hardware construction will be omitted, and the software construction will be described with reference to FIG. 4 and FIG. 5, the latter of which shows an example of the software. In the controller 7, a reference value So of the light transmittance of a normal liquid crystal 2 is set beforehand through external operation (step 121). Inputted to the controller 7 are the irradiation quantity of light R1 of the light emitting means 5 and the transmitted quantity of light R2 from the light receiving means 6, on the basis of which a detection value Si of the transmittance is calculated (step 122). Next, the controller 7 compares the detection value Si with the above mentioned reference value So (step 123). When they are not equal to each other, the controller 7 adjusts the applied voltage Vi of the liquid crystal 2 so that they become equal to each other (step 124). This makes it possible to constantly maintain a high level of printing accuracy. This embodiment is particularly suitable for cases in which there is no need to consider the liquid crystal temperature Ti as a parameter, for example, a case in which the apparatus is installed in an environment of a constant temperature.

Figure 5:
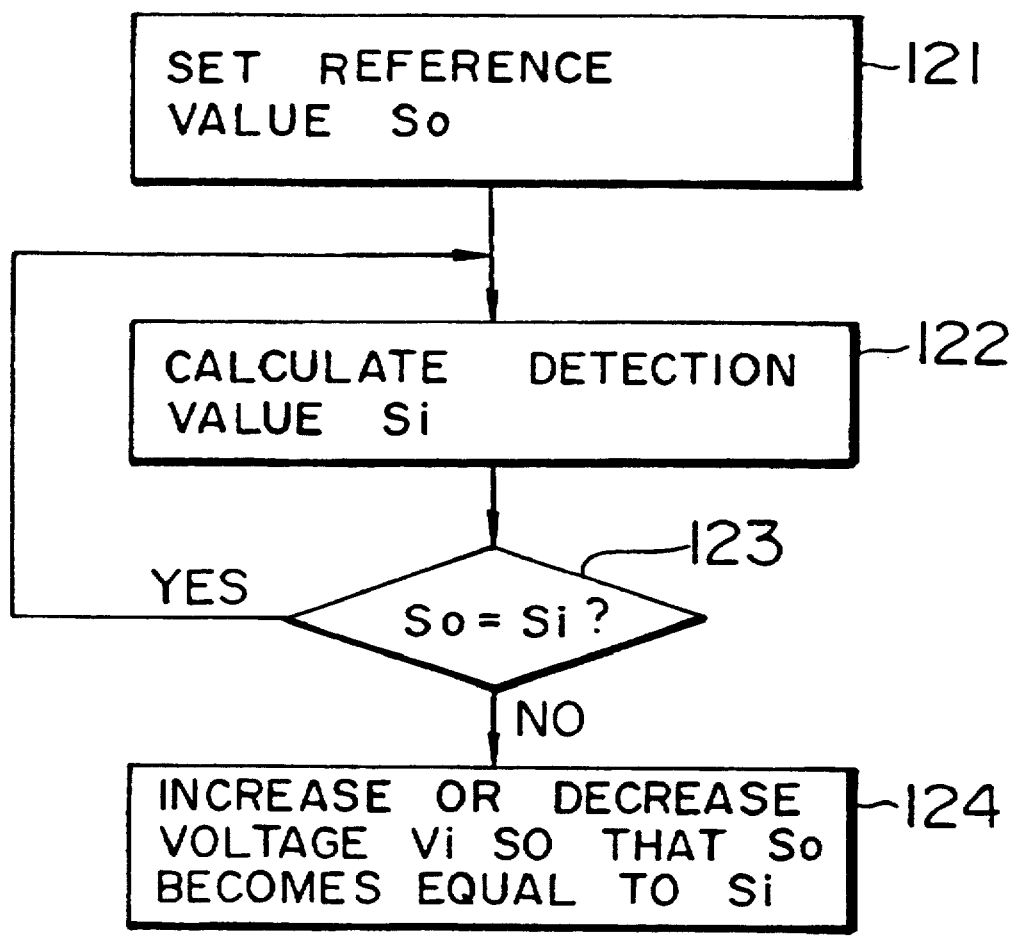
FIG. 5 is a flowchart illustrating control procedures for a controller according to the second aspect of the present invention.
Figure 6:
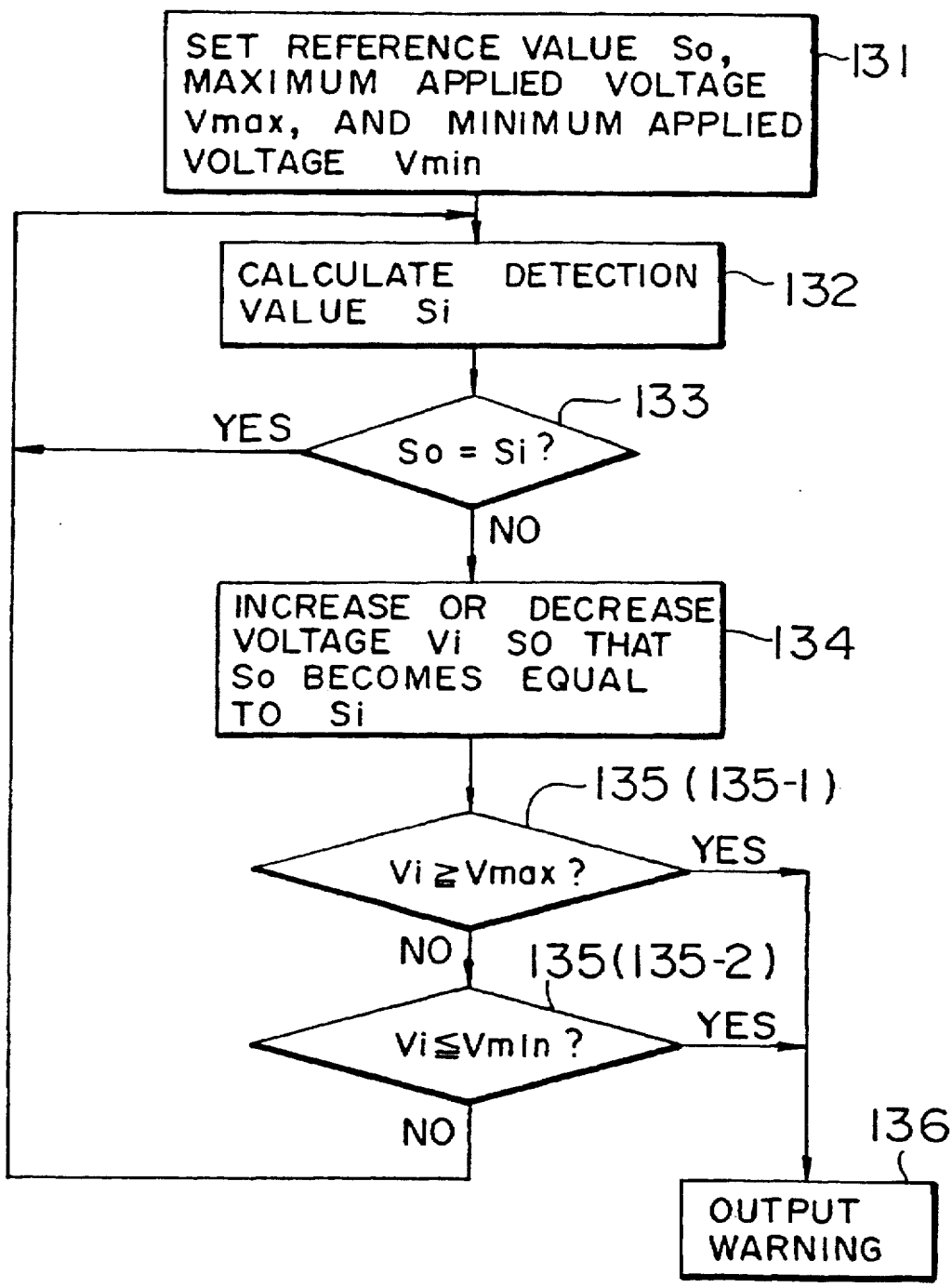
FIG. 6 is a flowchart illustrating control procedures for a controller in another embodiment according to the second aspect of the present invention.

Next, FIG. 6 shows an embodiment of the software construction which is different from that of FIG. 5. Previously set in the controller 7, through external operation, are the reference value So of the light transmittance of a normal liquid crystal 2 and the liquid crystal application voltage threshold value Vm, of which the maximum and minimum application voltage threshold values Vmax and Vmin are determined beforehand (step 131). The controller 7 calculates the detection value Si of the light transmittance from the irradiation quantity of light R1 of the light emitting means 5 and the transmitted quantity of light R2 of the light receiving means 6 (step 132). Next, it compares this detection value Si with the reference value So (step 133). When the values are different from each other, the controller 7 adjusts the applied voltage Vi of the liquid crystal 2 by increasing or decreasing it so that the detection value Si becomes equal to the reference value So (step 134). In this adjustment, the adjusted applied voltage Vi of the liquid crystal is compared with the maximum application voltage threshold value Vmax and the minimum application voltage threshold value Vmin (step 135). When Vi≧Vmax (step 135-1), or when Vi≦Vmin (step 135-2), a warning is outputted (step 136). The warning can be given by a separately provided alarm, display lamp or the like. Due to this arrangement, it is possible to maintain the printing accuracy at a constant level and properly judge the degree of deterioration of the liquid crystal, which must be dealt with by replacement or the like.

The term "light transmittance" also covers the following cases, etc: for example, in the calculation of the light transmittances Q, Qo and Qi, when all the values of the irradiation light quantity R1 of the light emitting means 5, on which they are based, are the same, the object of the present invention can be achieved solely through comparison of the transmission light quantities R2, without having to calculate the light transmittances Q, Qo and Qi one by one. In another case, the irradiation quantity of light R1, when calculating the optimum light transmittance Qo of the normal liquid crystal 2, and the irradiation quantity of light R1, when calculating the light transmittance Qi of the liquid crystal 2 in use, are set in a predetermined proportion (for example, 1/1.5), whereby it is possible to achieve the object of the present invention through comparison of the transmittance light quantities R2. Thus, in these cases also, the operation is substantially the same as the calculation of the light quantity.

A preferred embodiment of a laser liquid crystal marker according to the third aspect of the invention will now be described in detail with reference to the accompanying drawings.

This embodiment will be separately described with respect to the hardware and software constructions thereof. In the hardware construction, as shown in FIG. 4, the laser beam L1, emitted from the laser oscillator 1, first travels through a beam shaping device 81, and is first deflected in the Y direction by the galvanoscanner 9Y. Then, it is deflected in the X direction by the polygon mirror 9X to scan a still marking image on the liquid crystal 2. The laser beam thus deflected is further deflected by a lens 82 and condensed on a reflecting mirror 83. In this process, scanning irradiation is effected on the still marking image on the liquid crystal 2. A transmission laser beam L2, which is in conformity with this still marking image, is applied to the reflecting mirror 83. The transmitted laser beam L2, reflected by the reflecting mirror 83, is transmitted through an objective lens 84 before it is applied to the surface of a workpiece 3 on a workpiece feeder 10, to thereby print the still marking image on the surface of the workpiece 3. In this construction, the driving system for the laser oscillator 1, the XY deflectors 9X and 9Y, the liquid crystal 2 and the workpiece feeder 10, are electrically connected to a controller 7 and synchronously controlled by the controller 7.

Further, apart from the above still marking image, the liquid crystal 2 also displays, as needed, a still test image through the application of voltage from the controller 7. Further, the light emitting means 5, consisting of a light emitting device or the like, and the light receiving means 6, consisting of a light receiving device or the like, are provided. Light from this light emitting means 5 is transmitted through the still test image displayed on the liquid crystal 2, and the transmitted light is received by the light receiving means 6. Further, the transmitted quantity of light R2 of this received light is outputted by the light receiving means 6 to the controller 7. The light emitting means 5 and the light receiving means 6 are electrically connected to the controller 7 and synchronously controlled by this controller 7. Further, the controller 7 stores in advance an optimum light transmittance Qo and the irradiation quantity of light R1 of the light emitting means 5. The optimum light transmittance Qo is a value set in the controller 7 in advance, based on the characteristics of the liquid crystal 2 when the laser liquid crystal marker is in continuous service.

Figure 7:
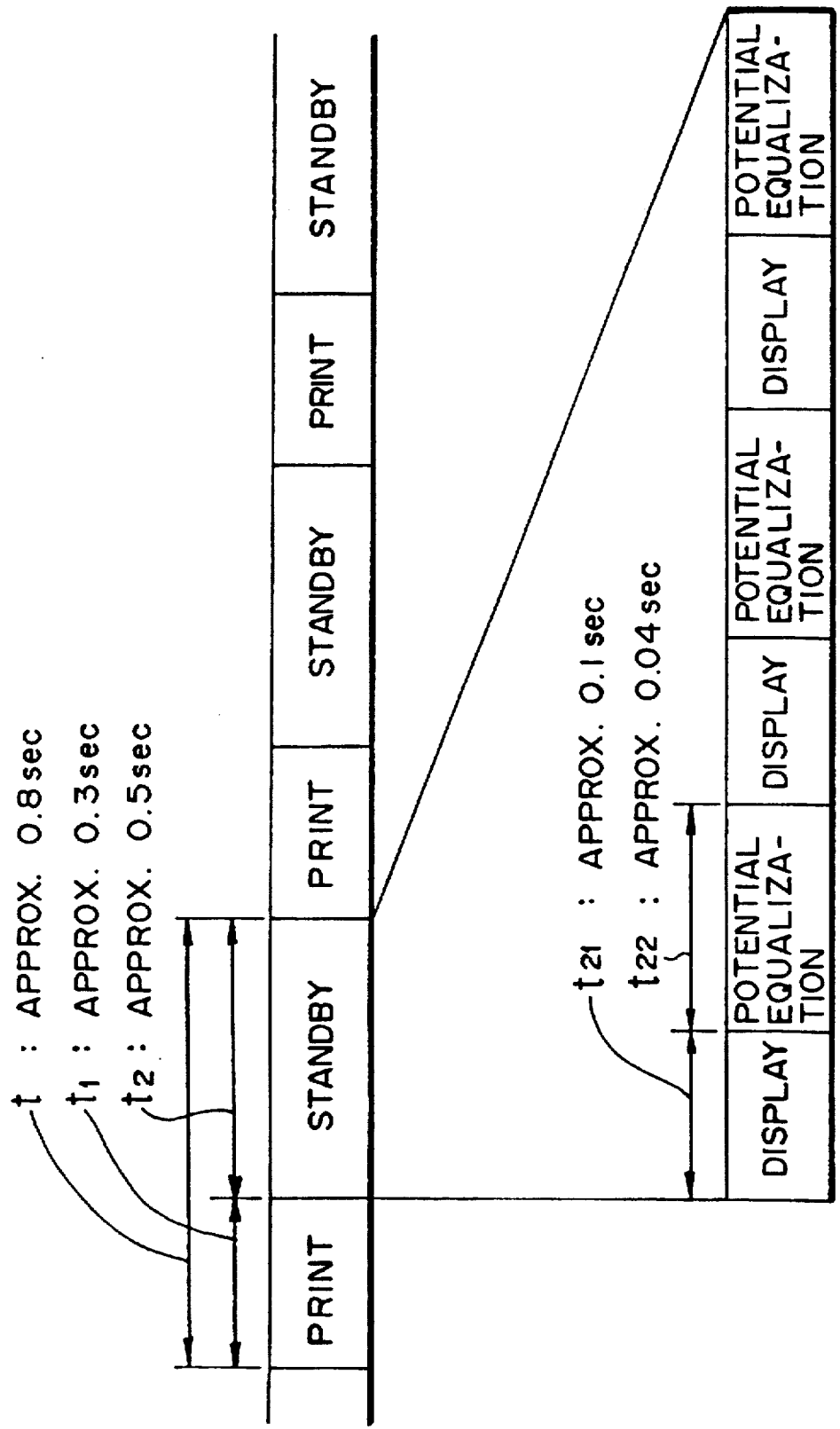
FIG. 7 is a diagram showing an example of a printing cycle according to the third aspect of the present invention.
Figure 8:
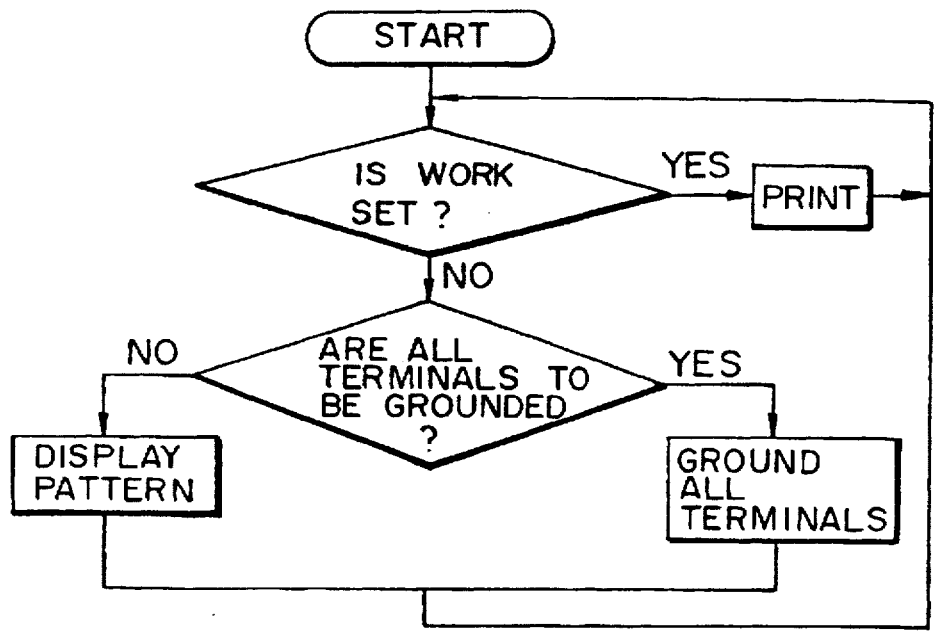
FIG. 8 is a flowchart illustrating control procedures for a controller according to the third aspect of the present invention.

Next, the software construction will be described. As shown in FIG. 7, this embodiment consists of a high accuracy, high speed continuous printing laser liquid crystal marker having a printing cycle t of approximately 0.8 second. One cycle is composed of a still marking image display time (printing time) t1, which is approximately 0.3 second, and a workpiece standby time (workpiece moving and printing position fixing time) t2, which is approximately 0.5 second. The workpiece standby time t2 is composed of interrupt display periods t21 for the still test image, each of which is approximately 0.1 second, and potential equalization periods t22 for adjusting the voltages at all the common and segment terminals of the liquid crystal 2 to 0V (that is, grounding all the terminals), each of which is approximately 0.04 second. These display and potential equalization periods are each repeated three times. A control flowchart for this repetitive control is shown in FIG. 8.

In this construction, of the three occurrences of the interrupt display of the still test image, in the first interrupt display period t21 for the still test image, the controller 7 inputs the transmitted quantity of light R2 from the light receiving means 6, and, from this transmitted quantity of light R2 and the irradiation light quantity R1, calculates the actual light transmittance Qi, adjusting the applied voltage Vi of the liquid crystal for the still images so that the light transmittance Qi becomes equal to the optimum light transmittance Qo. This makes it possible to maintain a high accuracy printing, even in the case of a laser liquid crystal marker of a high speed continuous printing type. It is naturally possible to repeat the input, calculation, comparison and adjustment in all of the three interrupt display periods, or this repetition may be only effected at odd or even numbers of times of occurrence of interrupt display as needed. Further, the number of times of interrupt display in the workpiece standby period t2 is not limited to three; it can also be two or less or four or more.

Although the above embodiment has been described with reference to a laser liquid crystal marker of a high speed continuous printing type, it should be noted that the display of a still marking image subsequent to a still test image must inevitably mean that the still test image is erased. Thus, in a laser liquid crystal marker in which there is sufficient time for the after image of the still test image to disappear, it is only necessary to effect interrupt display of the still test image during a rewriting period for a still marking image if the printing to be performed is such that it allows sufficient time for the after image to disappear.

A preferred embodiment of a method of judging deterioration of liquid crystal according to the fourth aspect of the invention will be described with reference to the accompanying drawings.

Figure 9:
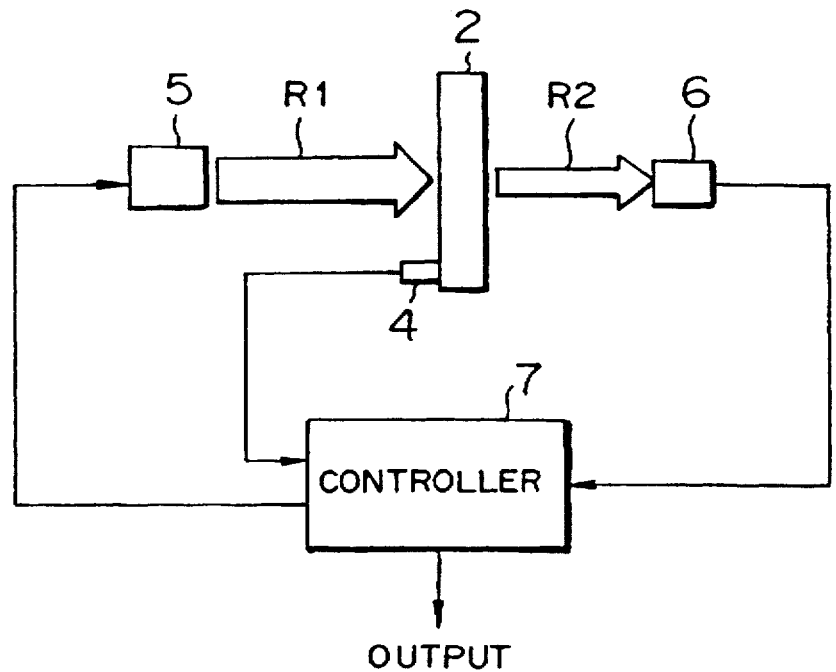
FIG. 9 is a schematic diagram illustrating a system for measuring the degree of deterioration of a liquid crystal according to the fourth aspect of the invention.

In this embodiment, only that section related to the judgment of the deterioration of the liquid crystal 2 in the first aspect of the invention is extracted as an application example. FIG. 9 schematically illustrates the construction of a laser liquid crystal marker according to this embodiment. First, to check the condition of deterioration of the liquid crystal 2, the liquid crystal 2 is irradiated with light in an irradiation quantity R1 from the light emitting means 5, and the light transmitted through this liquid crystal 2, in a transmitted quantity of light R2, is received by the light receiving means 6, and, on the basis of the irradiation light quantity R1 and the transmitted quantity of light R2, a light transmittance Qi is calculated by the controller 7. With respect to this light transmittance Qi, items of data, obtained through changes with time, are compared with a light transmittance serving as a reference corresponding to the limit of deterioration; when the data obtained through changes with time is in excess of this reference value, it is determined that the liquid crystal 2 has deteriorated. Due to this arrangement, it is possible to judge the deterioration of the liquid crystal rationally and correctly. Regarding the environment in which the laser liquid crystal marker is to be installed, if it is difficult to maintain the liquid crystal 2 at a fixed temperature, it is desirable to equip the liquid crystal 2 with a temperature sensor 4 and take the temperature into account when judging the degree of deterioration. Further, this method of judging deterioration is, as is apparent from the hardware construction schematically shown in FIG. 9, applicable to the laser liquid crystal markers of the present invention described above. Further, it is also applicable to ordinary laser liquid crystal markers as long as they use a transmission type liquid crystal 2.

The laser liquid crystal markers to which the present invention are applicable are not limited to the types of laser liquid crystal markers shown in the above embodiments but are applicable to other types of laser liquid crystal markers. There is naturally no limitation regarding the type of lens, the mounting position thereof, etc. Further, instead of the XY deflectors in the above described constructions (see FIG. 1) (that is, scanning can be done away with), it is possible to adopt, for example, a system in which a laser beam L1 is collectively applied from the laser oscillator 1 to the entire pattern of the liquid crystal 2 through a magnifying lens, or a system in which, instead of the reflecting mirror 83, a second XY deflector is additionally provided at this position so as to realize a wide printing range without having to move the workpiece.

INDUSTRIAL APPLICABILITY

In accordance with the present invention, there are provided a useful laser liquid crystal marker and method of judging deterioration of the liquid crystal, in which the application voltage is controlled for adjustment in correspondence with the degree of deterioration of the liquid crystal, whereby a high level of printing accuracy can be maintained, and the time for replacement of the liquid crystal can be determined; further, even in the case of a continuous high speed printing, a high level of printing accuracy can be maintained.

What is claimed is:

1. A laser liquid crystal marker comprising:

a liquid crystal for arbitrarily displaying a pattern;

a laser oscillator for emitting a laser beam which is transmitted from said laser oscillator through said liquid crystal and onto a surface of a workpiece to thereby print said pattern on said surface of said workpiece;

a controller connected to said liquid crystal and adapted to control a liquid crystal application voltage which is applied to said liquid crystal for displaying said pattern;

a light emitter for irradiating said liquid crystal with a quantity R1 of light; and a light receiver for receiving light from said light emitter which has been transmitted through said liquid crystal and for inputting to said controller a value representative of the thus transmitted quantity R2 of light received by said light receiver;

said controller being adapted to use said value representative of said quantity R2 to provide a detection value of light transmittance by said liquid crystal; and said controller being adapted to determine a degree of deterioration of said liquid crystal from changes with time of said detection value of light transmittance.

2. A laser liquid crystal marker comprising:

a liquid crystal for arbitrarily displaying a pattern;

a laser oscillator for emitting a laser beam which is transmitted from said laser oscillator through said liquid crystal and onto a surface of a workpiece to thereby print said pattern on said surface of said workpiece;

a controller connected to said liquid crystal and adapted to control a liquid crystal application voltage which is applied to said liquid crystal for displaying said pattern;

a light emitter for irradiating said liquid crystal with a quantity R1 of light; and a light receiver for receiving light from said light emitter which has been transmitted through said liquid crystal and for inputting to said controller a value representative of the thus transmitted quantity R2 of light received by said light receiver;

said controller being adapted to use said value representative of said quantity R2 to provide a detection value of light transmittance by said liquid crystal; and said controller being adapted to adjust the liquid crystal application voltage responsive to changes in said detection value of light transmittance.

3. A laser liquid crystal marker in accordance with claim 2, further comprising:

a temperature sensor connected to said controller for detecting a temperature of said liquid crystal;

wherein said controller is adapted to store in advance correlation characteristics P of liquid crystal application voltages V and light transmittances Q using liquid crystal temperatures T in a normal liquid crystal as parameters;

wherein said controller is adapted to receive a value representative of said quantity R1;

wherein said controller is adapted to use said value representative of said quantity R1 and said value representative of said quantity R2 to calculate said detection value of light transmittance;

wherein said controller is adapted to extract from the thus stored correlation characteristics P an optimum light transmittance corresponding to a voltage Vi and the thus detected temperature, wherein said voltage Vi is a liquid crystal application voltage applied to said liquid crystal at the time of the calculation of said detection value of light transmittance; and wherein said controller is adapted to adjust the liquid crystal application voltage responsive to changes in said detection value of light transmittance in an effort to cause said detection value of light transmittance to become equal to said optimum light transmittance.

4. A laser liquid crystal marker in accordance with claim 3, wherein said light emitter for applying light to said liquid crystal also inputs to said controller said value representative of said quantity R1.

5. A laser liquid crystal marker in accordance with claim 3, wherein, when said detection value of light transmittance does not become equal to said optimum light transmittance even by adjusting the liquid crystal application voltage which is applied to said liquid crystal, said controller outputs a message to the effect that said liquid crystal has deteriorated.

6. A laser liquid crystal marker in accordance with claim 2, wherein:

said controller is adapted to store in advance a reference value So, which corresponds to light transmittance of a normal liquid crystal;

said controller is adapted to use a value representative of said quantity R1 and said value representative of said quantity R2 to calculate a detection value of light transmittance by said liquid crystal; and wherein said controller adjusts the liquid crystal application voltage applied to said liquid crystal in an effort to cause said detection value of light transmittance to become equal to said reference value So.

7. A laser liquid crystal marker in accordance with claim 6, wherein said laser liquid crystal marker is installed in an environment of a constant temperature, and wherein said reference value So corresponds to a light transmittance of a normal liquid crystal at a working liquid crystal temperature within said environment of a constant temperature.

8. A laser liquid crystal marker in accordance with claim 6, wherein said light emitter for applying light to said liquid crystal also inputs to said controller said value representative of said quantity R1.

9. A laser liquid crystal marker in accordance with claim 6, wherein said controller stores in advance a liquid crystal application voltage threshold value Vm; and wherein, when said liquid crystal application voltage which is applied to said liquid crystal is in excess of said liquid crystal application voltage threshold value Vm, said controller outputs a warning.

10. A laser liquid crystal marker comprising:

a liquid crystal for arbitrarily displaying a still marking image;

a laser oscillator for emitting a laser beam which is transmitted from said laser oscillator through said liquid crystal and onto a surface of a workpiece to thereby print on said surface of said workpiece the thus displayed still marking image;

a controller connected to said liquid crystal and adapted to control a liquid crystal application voltage which is applied to said liquid crystal to successively effect a rewrite display of a still marking image during a plurality of rewrite procedures;

wherein said controller is adapted to effect interrupt display of a still test image on said liquid crystal during at least one of said rewrite procedures for said still marking image;

a light emitter for applying an irradiation quantity R1 of light to said liquid crystal so as to project light onto the still test image thus displayed on said liquid crystal;

a light receiver for receiving light from said light emitter which has been transmitted through said still test image thus displayed on said liquid crystal;

wherein said controller is adapted to store in advance an optimum light transmittance Qo, wherein said controller is adapted to input from said light receiver, during said interrupt display, a value representative of a transmitted quantity R2 of light transmitted from said light emitter through the thus displayed still image to said light receiver, and wherein said controller is adapted to calculate a light transmittance Qi of said liquid crystal from said value representative of said transmitted quantity R2 and a value representative of said irradiation quantity R1, and wherein said controller is adapted to adjust the liquid crystal application voltage applied to said liquid crystal in an effort to cause said light transmittance Qi to become equal to said optimum light transmittance Qo.

11. A laser liquid crystal marker in accordance with claim 10, wherein said controller is adapted to:

first effect display of said still test image during at least one of said rewrite procedures for said still marking image, then effect interrupt of repetition of equalization in electric potential of all common and segment terminals of said liquid crystal, input from said light receiver, during said interrupt of repetition of equalization, a value representative of said transmitted quantity R2, and calculate a light transmittance Qi of said liquid crystal from the thus inputted value representative of said transmitted quantity R2 and said value representative of said irradiation quantity R1, and adjust the liquid crystal application voltage applied to said liquid crystal in an effort to cause said light transmittance Qi to become equal to said optimum light transmittance Qo.

12. A method for determining deterioration of a liquid crystal in a laser liquid crystal marker which is equipped with said liquid crystal for arbitrarily displaying a pattern in response to a liquid crystal application voltage, and which applies a laser beam, emitted from a laser oscillator and transmitted through said liquid crystal, to a surface of a workpiece to thereby print said pattern on said surface of said workpiece, said method comprising:

irradiating said liquid crystal with a quantity R1 of light; and detecting a quantity R2 of said light which has been transmitted through said liquid crystal;

using a value representative of said quantity R2 to provide a detection value of light transmittance by said liquid crystal; and determining a degree of deterioration of said liquid crystal from changes with time of said detection value of light transmittance.

13. A method in accordance with claim 12, wherein said step of using said value representative of said quantity R2 to provide comprises calculating said detection value of light transmittance based on a value representative of said quantity R1 and said value representative of said quantity R2.

14. A method in accordance with claim 12, further comprising:

measuring a temperature Ti of said liquid crystal;

storing correlation characteristics P of liquid crystal application voltages V and light transmittances Q using liquid crystal temperatures T in a normal liquid crystal as parameters;

extracting from the thus stored correlation characteristics P an optimum light transmittance corresponding to the thus measured temperature and a liquid crystal application voltage which is applied to said liquid crystal at the time of the providing of said detection value of light transmittance; and adjusting the liquid crystal application voltage applied to said liquid crystal in an effort to cause said detection value of light transmittance to become equal to said optimum light transmittance.

15. A method in accordance with claim 14, wherein said step of using said value representative of said quantity R2 to provide comprises calculating said detection value of light transmittance based on a value representative of said quantity R1 and said value representative of said quantity R2.

16. A method in accordance with claim 14, further comprising:

wherein, when said detection value of light transmittance does not become equal to said optimum light transmittance even by adjusting the liquid crystal application voltage which is applied to said liquid crystal, establishing a message to the effect that said liquid crystal has deteriorated.

17. A method in accordance with claim 12, wherein said step of using said value representative of said quantity R2 to provide comprises calculating a detection value of light transmittance by said liquid crystal based on a value representative of said quantity R1 and said value representative of said quantity R2, and further comprising:

storing in advance a reference value, which corresponds to light transmittance of a normal liquid crystal; and adjusting the liquid crystal application voltage applied to said liquid crystal in an effort to cause said detection value of light transmittance to become equal to said reference value.

18. A method in accordance with claim 17, further comprising maintaining said laser liquid crystal marker in an environment of a constant temperature; and wherein said reference value corresponds to light transmittance of a normal liquid crystal at a working liquid crystal temperature within said environment of a constant temperature.

19. A method in accordance with claim 17, further comprising:

storing in advance a liquid crystal application voltage threshold value Vm; and outputting a warning when said liquid crystal application voltage which is applied to said liquid crystal is in excess of said liquid crystal application voltage threshold value Vm.

20. A method in accordance with claim 12, further comprising:

adjusting the liquid crystal application voltage applied to said liquid crystal responsive to changes in said detection value of light transmittance;

storing in advance a liquid crystal application voltage threshold value Vm; and outputting a warning when said liquid crystal application voltage which is applied to said liquid crystal is in excess of said liquid crystal application voltage threshold value Vm.

* * * * *